June 18, 1929.                    A. KIPNIS                    1,717,389
COUPLING MEANS FOR ELECTRICAL CONDUITS AND THE LIKE
Original Filed Aug. 25, 1922           2 Sheets-Sheet 1
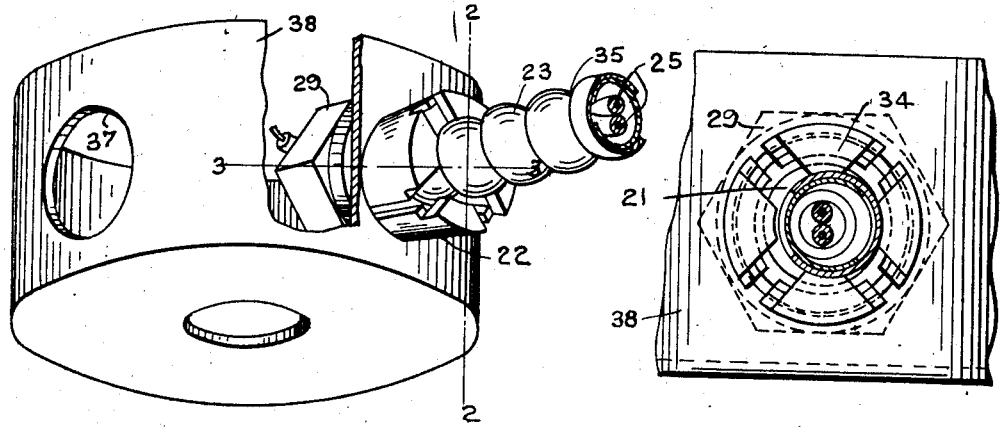
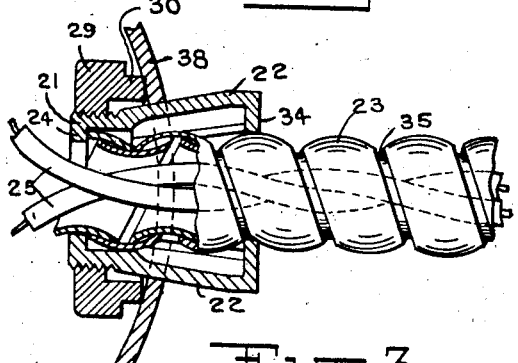
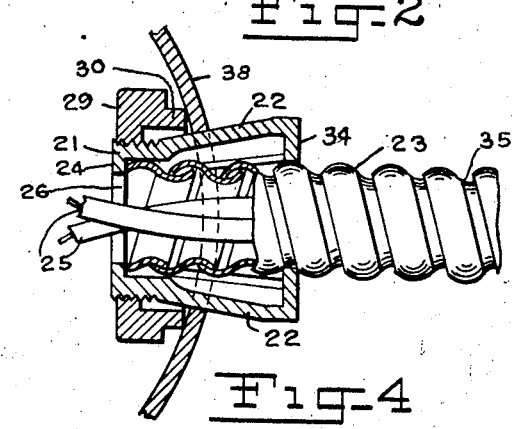
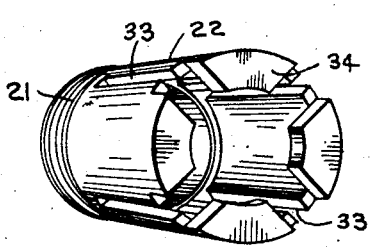
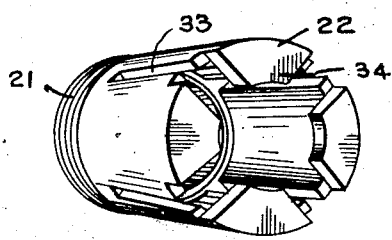
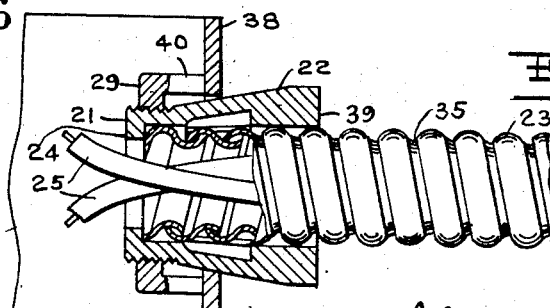
Inventor:
Abraham Kipnis
By his Attorney
Edmund Congar Brown

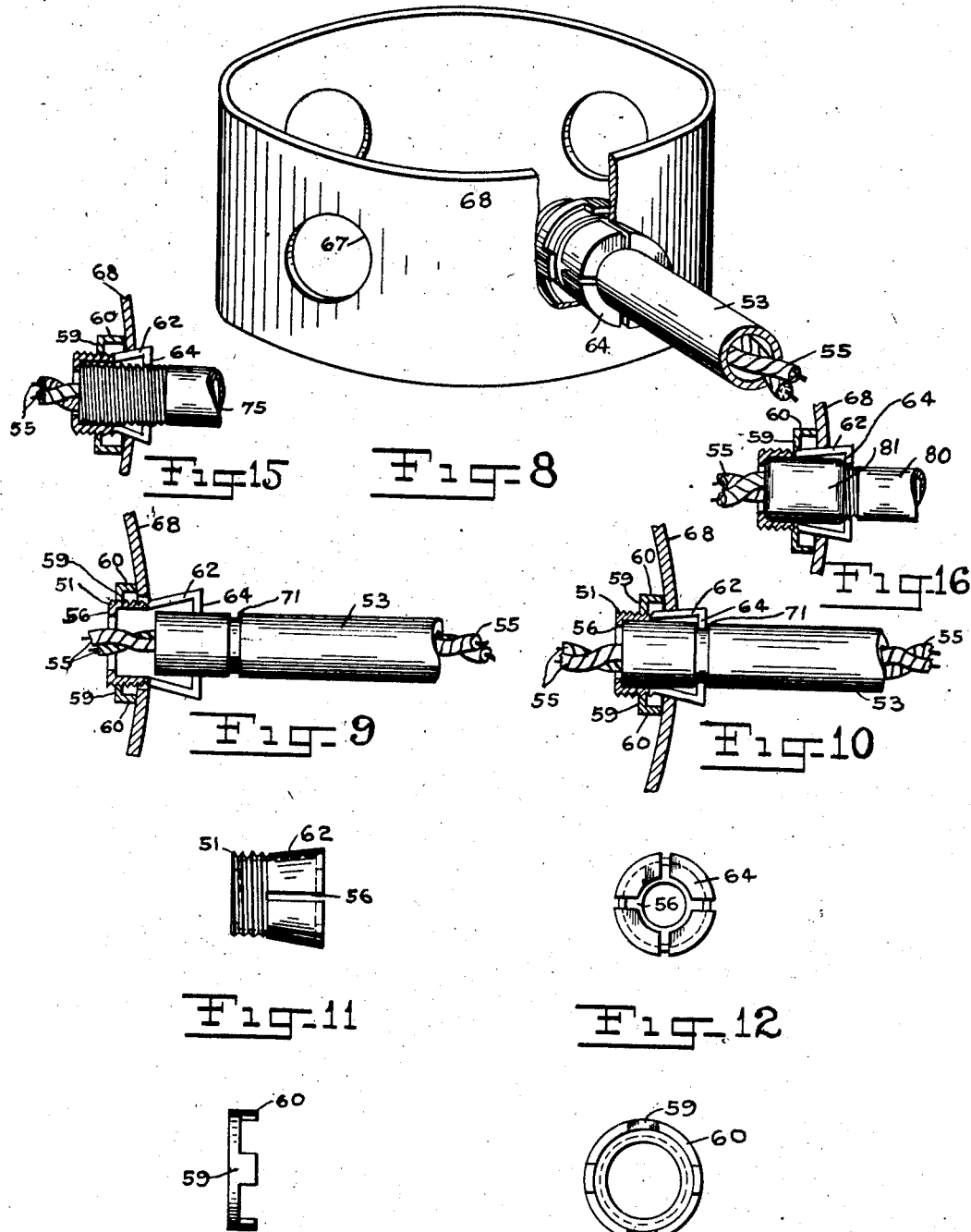

Patented June 18, 1929.

1,717,389

UNITED STATES PATENT OFFICE.

ABRAHAM KIPNIS, OF NEW YORK, N. Y.

COUPLING MEANS FOR ELECTRICAL CONDUITS AND THE LIKE.

Application filed August 25, 1922, Serial No. 584,289. Renewed August 1, 1928.

The invention relates to means for coupling and securing to junction-boxes and the like, sections of tubing or conduit adapted to contain electrical conductors. The object of the invention is to provide a simple and effectual means for securing to a junction-box a portion of such an electrical conduit, the invention being applicable both to flexible and non-flexible conduits.

The invention comprises as one of its principal features a screw-threaded sleeve which is adapted to be passed through an opening in the casing of a junction-box or the like, and to engage with a nut on the interior of the casing, said sleeve being provided with a plurality of flaring yielding arms which are adapted to bear against the sides of the opening in the casing and also to engage with a portion of a conduit placed within said sleeve between said arms, the construction being such that when said sleeve and said nut are rotated with reference to each other in the proper direction, the sleeve is drawn inwards through the opening in the casing and the flaring arms thereby moved inwards or pressed towards each other, so as to grip the portion of the conduit placed therebetween. The invention further consists in various details of construction, arrangement and combination of elements and parts, as set forth in the claims hereof, certain embodiments of the invention being illustrated in the accompanying drawings and described in this specification.

In the said drawings,

Fig. 1 is a perspective view showing a flexible conduit secured to the casing of a junction-box by means of the coupling device forming part of my invention;

Fig. 2 is a cross-section through the flexible conduit approximately on the line 2—2 of Fig. 1;

Fig. 3 is a horizontal section approximately on the line 3—3 of Fig. 1;

Fig. 4 is a view similar to Fig. 3 showing a modification having less pitch to the spiral groove forming part of the flexible conduit;

Fig. 5 is a perspective view of the screw-threaded sleeve and flaring arms, showing one of the jaws of the flaring arms extending nearer to the centre of the sleeve than the others for the purpose of engaging the spiral groove of the flexible conduit;

Fig. 6 is a perspective view of a modification in which the jaws of the flaring arms extend equally toward the centre of the sleeve sufficient to cause the formation of a broken circular opening that is approximately equal to the diameter of the flexible conduit, the jaws adapted to enter the spiral groove of the conduit;

Fig. 7 is a sectional view showing a modification in which the jaws of the flaring arms extend equally toward the centre of the sleeve a distance sufficient to cause the formation of a broken circular opening that is approximately equal to the diameter of the flexible conduit, the jaws having a thickness exceeding the width of the spiral groove of the conduit;

Fig. 8 is a perspective view showing a non-flexible conduit secured to the casing of a junction-box by means of the coupling device forming part of my invention;

Fig. 9 is a cross-section of the casing and the coupling device in position, showing the end of a section of conduit inserted between the flaring arms, but not in complete engagement therewith;

Fig. 10 is a view similar to Fig. 9 but showing the section of conduit engaged by the flaring arms;

Fig. 11 is a side view of a part of the coupling device;

Fig. 12 is an end view of the same;

Fig. 13 is a side view of the nut which is adapted to engage with the screw-threads of the coupling device;

Fig. 14 is an end view of the same; and

Figs. 15 and 16 are views showing modifications hereafter more fully described.

In carrying my invention into effect in the embodiments thereof which I have selected for description in this specification and illustration in the accompanying drawings, and having reference now particularly to the embodiment shown in Figs. 1 to 7 inclusive, I provide a sleeve 21 having an internal diameter equal to the external diameter of a flexible conduit 23 placed therein. This sleeve is adapted to be inserted in an opening, as 37, in the casing of a junction-box 38, and one of such sleeves is shown in position in a junction-box in the perspective view Fig. 1. The end of the flexible conduit bears against a flange 24 while the insulated conductors 25 contained within the conduit are passed through an opening 26 in the end of the sleeve. The exterior of the sleeve is screw-threaded so as to engage with the internally screw-threaded nut 29. Said nut 29 is provided with a cylindrical extension 30 that has an internal diameter considerably greater than the diameter of the sleeve 21. Forming part of the sleeve 21 are four flaring arms 22 separated by slits 33 which permit swinging movement of the arms toward the centre of the sleeve. Each flaring arm 22 is provided with a jaw 34 extending toward the centre of the sleeve. In the device shown in Figs. 1 to 5 one jaw 34 extends to a point removed from the axis of the sleeve equal to the radius of the internal diameter of said sleeve, the jaw of the arm diametrically opposite extending nearer to the centre of the sleeve while the jaws of the arms at right angles to said arms extend a proportionate distance, whereby a broken circular opening is formed that stands eccentric to said internal diameter of the sleeve, so that, by causing the spiral groove 35 of the flexible conduit to engage with the jaw 34 extending nearer to the centre of the sleeve, and by the rotation of the sleeve, the conduit may be screwed into said sleeve and be held in line with the longitudinal axis thereof.

By reference to Figs. 3 and 4 it will be seen that instead of screwing the conduit into the sleeve a wriggling motion of the conduit will permit one of the jaws to pass over the rounded thread of the conduit and enter the spiral groove 35 and then permit another jaw to pass over the thread and so on until the end of the conduit reaches the cylindrical interior tube of the sleeve.

The screw threaded end of the sleeve 21 is passed through a circular opening 37 that is formed in the casing 38 and the sleeve is held in place by means of a nut 29 engaging the screw threads of the sleeve. The flexible conduit may if desired be placed in the sleeve after its connection to the casing. With the cylindrical extension 30 of the nut 29 bearing against the interior of the casing 38 and by the rotation of the nut, the sleeve is moved toward the interior of the casing, and by engagement of the flaring arms and jaws 34 of the sleeve against the side of the opening 37, the jaws 34 of the arms are forced in against the conduit. It will be seen that the resistance to movement of the jaws, caused by the conduit, causes the sleeve to be clamped against the casing, thereby effecting at one operation the simultaneous clamping of the conduit to the sleeve and the sleeve to the casing. Also it will be seen that engagement of one of the jaws with the spiral groove of the conduit serves to increase the hold which the sleeve has upon the conduit when so clamped.

In the modification shown in Fig. 6, the sleeve can be rotated after the conduit is placed in the sleeve, and when so rotated, one of the jaws will be forced into the spiral groove of the conduit.

In the modification shown in Fig. 7, the jaws are thicker as shown at 39 so that they will not enter the spiral grooves of the conduit, friction then being the means employed for holding the conduit to the sleeve. The nut shown in Fig. 7 is provided with extension arms 40 which bear against the interior of the casing, thereby causing friction which enables rotation of the sleeve in the nut to be performed.

In Figs. 8 to 14 inclusive I have shown an embodiment of the invention employed in combination with a section of non-flexible conduit. In these figures I have shown a junction-box 68 similar to that already described, provided with openings 67, in one of which is located a sleeve 51 provided with flaring arms 62, inturned jaws 64 at one end, and an inturned flange 56 at the other end. The inner end of the sleeve is externally screw-threaded, so as to be adapted to engage with an internally screw-threaded nut 59, having inwardly projecting members 60. All of these parts are anologous to the parts already described. In connection with the devices above referred to, I provide a conduit 53, containing conductors 55. Near one end of the conduit I form a groove 71 with which is adapted to engage the internally extending jaws 64.

In the modification shown in Fig. 15 the portion of the conduit 75 which is adapted to enter the sleeve and be gripped by the internally extending jaws on the ends of the flaring arms, is screw-threaded so as to enable the jaws to hold thereto by friction.

In the modification shown in Fig. 16, the inner end of the conduit 80 is provided with a sleeve 81, the external diameter of which is of course somewhat greater than the external diameter of the conduit itself, and the outer end of this sleeve therefore forms an annular bearing against which the internally extending jaws of the sleeve may bear.

The operation of my invention in its various embodiments will be obvious from what has been above said with regard to its construction.

The advantages of the same will also be obvious, and space need not be occupied to point same out specifically.

Having thus described my invention, what I claim as new and desire to secure by Letters Patent is as follows:

1. A device of the character described, comprising a screw threaded sleeve adapted to enter an opening in a casing and to surround an electrical cable to be secured therein; and a nut bearing on the inside of said casing and adapted to engage said sleeve; said sleeve having a series of yielding jaws extending toward the axis of the sleeve but some of said jaws extending further than others, in a predetermined order, whereby a broken circular opening is formed that stands eccentric to said longitudinal axis of the sleeve, whereby a flexible conduit having a spiral groove may be held in line with the longitudinal axis of said sleeve by said jaws, the jaw extending nearest to the axis of the sleeve being then in engagement with said spiral groove of said flexible conduit.

2. A device of the character described, comprising a screw threaded sleeve adapted to enter an opening in a casing, and a nut adapted to engage said sleeve bearing on the interior of the casing, said sleeve having an internal diameter substantially equal to the external diameter of a flexible conduit which may be placed therein; said sleeve having a series of jaws extending toward the axis of the sleeve, one of said jaws extending to a point removed from the axis of the sleeve equal to the radius of said internal diameter of said sleeve, the jaw diametrically opposite extending nearer to the axis of said sleeve, while the jaws at right angles to said jaws extend an intermediate distance, whereby a broken circular opening is formed that stands eccentric to said longitudinal axis of the sleeve, whereby the flexible conduit having a spiral groove may be held in line with the longitudinal axis of said sleeve, said jaw extending nearest to the axis of the sleeve being then in engagement with said spiral groove of said flexible conduit.

3. A device of the character described, comprising a screw threaded sleeve adapted to enter an opening in a casing, and a nut adapted to engage said sleeve bearing on the interior of the casing; said sleeve having an internal diameter substantially equal to the external diameter of a flexible conduit which may be placed therein; said sleeve having a series of jaws extending toward the axis of the sleeve, one of said jaws extending nearer to the axis than the others, which latter are placed at such distances radially from the axis that a broken circular opening is formed that stands eccentric to said longitudinal axis of the sleeve, whereby the flexible conduit having a spiral groove may be held in line with the longitudinal axis of said sleeve, said jaw extending nearest to the axis of the sleeve being then in engagement with said spiral groove of said flexible conduit.

4. A device of the character described, comprising a screw threaded sleeve adapted to enter an opening in a casing, and a nut bearing on the interior of the casing adapted to engage said sleeve; said sleeve having a series of jaws extending toward the axis of the sleeve, one of said jaws extending nearer to the axis than the others, which latter are placed at such distances radially from the axis that a broken circular opening is formed that stands eccentric to the longitudinal axis of said sleeve; whereby a flexible conduit having a spiral groove engaging said jaw extending nearest to the axis of the sleeve, may by rotation of the sleeve be screwed into said sleeve.

5. A device of the character described, comprising a screw threaded sleeve adapted to enter a circular opening in a casing, and a nut bearing on the interior of the casing and adapted to engage said sleeve; said sleeve having an internal diameter, substantially equal to the external diameter of a flexible conduit, which may be placed therein, said sleeve also having a series of flaring yielding arms which bear against the side of the opening in the casing, said arms having jaws extending toward the axis of the sleeve, the jaw of one arm extending to a point removed from the axis of the sleeve equal to the radius of said internal diameter of said sleeve, the jaw of the arm diametrically opposite extending nearer to the axis of said sleeve, while the jaws of the arms at right angles to said arms extend an intermediate distance, whereby a broken circular opening is formed that stands eccentric to said internal axis of the sleeve, whereby the flexible conduit having a spiral groove may be held in line with the longitudinal axis of said sleeve, said jaw extending nearest to the center of the sleeve being then in engagement with said spiral groove of said flexible conduit; rotation of said screw threaded sleeve in said nut causing movement of the sleeve toward the interior of said casing, whereby the side of said opening in the casing acting on the flaring arms of said sleeve causes the jaws forming part of said arms to be forced against said conduit, whereby the conduit is secured to said sleeve and thereby secured to said casing.

In witness whereof I have hereunto signed my name this 24th day of August, 1922.

ABRAHAM KIPNIS.